US009667133B2

(12) United States Patent
Chataignere et al.

(10) Patent No.: US 9,667,133 B2
(45) Date of Patent: May 30, 2017

(54) BLACK START OF A MULTILEVEL VOLTAGE SOURCE CONVERTER

(75) Inventors: Fabienne Chataignere, Ludvika (SE); Lars Döfnäs, Ludvika (SE); Rolf Ottersten, Ludvika (SE); Patrik Sandquist, Örebro (SE); Roland Siljeström, Skultuna (SE); Erika Siljeström, legal representative, Skultuna (SE)

(73) Assignee: ABB SCHWEIZ AG, Baden (CH)

( * ) Notice: Subject to any disclaimer, the term of this patent is extended or adjusted under 35 U.S.C. 154(b) by 443 days.

(21) Appl. No.: 14/367,079

(22) PCT Filed: Dec. 19, 2011

(86) PCT No.: PCT/EP2011/073258
§ 371 (c)(1),
(2), (4) Date: Jul. 15, 2014

(87) PCT Pub. No.: WO2013/091675
PCT Pub. Date: Jun. 27, 2013

(65) Prior Publication Data
US 2016/0028303 A1   Jan. 28, 2016

(51) Int. Cl.
*H02J 1/00* (2006.01)
*H02J 3/00* (2006.01)
(Continued)

(52) U.S. Cl.
CPC ............ *H02M 1/36* (2013.01); *H02J 7/0052* (2013.01); *H02M 1/096* (2013.01); *H02M 2001/0006* (2013.01); *H02M 2007/4835* (2013.01)

(58) Field of Classification Search
CPC .... H02M 7/44; H02M 2001/007; H02M 3/04; H02M 2001/0077; H02M 7/487;
(Continued)

(56) References Cited

U.S. PATENT DOCUMENTS 6,009,369 A * 12/1999 Boisvert ............... F02P 19/026
123/145 A
9,160,226 B2 * 10/2015 Hosini .................... H02M 7/49
(Continued)

FOREIGN PATENT DOCUMENTS

CN    102210088 A    10/2011
DE   101 03 031 A1    7/2002
(Continued)

OTHER PUBLICATIONS

Holtz et al., "Gate Drive Power Recovery and Regenerative Snubber Scheme for Series-Connected GTOs in High Voltage Inverters", Conference Record of the 1999 IEEE Industry Applications Conference, Thirty-Fourth IAS Annual Meeting, Oct. 3, 1999, vol. 3, pp. 1535-1540.

*Primary Examiner* — Jared Fureman
*Assistant Examiner* — Esayas Yeshaw
(74) *Attorney, Agent, or Firm* — Birch, Stewart, Kolasch & Birch, LLP

(57) ABSTRACT

A voltage source converter includes a black start control unit and cells, where each cell includes a first switch between a first end of a cell capacitor and a first cell terminal, a second switch between a second end of the cell capacitor and the first cell terminal, where a second cell terminal is provided via the first or the second end of the cell capacitor, a first power supply unit and a second power supply unit, where the black start control unit is configured to perform, after the initial application of a DC voltage to a cell terminal of a cell and the subsequent initial charging of the chargeable power supply unit of one of the switches, charging of an uncharged power supply unit of the other switch through repeatedly turning on and off the switch with initially charged power supply unit.

20 Claims, 2 Drawing Sheets

(51) Int. Cl.
    *H02M 1/36*         (2007.01)
    *H02J 7/00*          (2006.01)
    *H02M 1/096*       (2006.01)
    *H02M 7/483*       (2007.01)
    *H02M 1/00*         (2006.01)

(58) Field of Classification Search
    CPC .......... H02M 1/12; H02M 3/158; H02M 7/04; H02M 7/42; H02M 7/5387; H02M 3/156; H02M 7/48; H02M 7/49; H02M 7/493; H02M 1/00
    See application file for complete search history.

(56) References Cited

U.S. PATENT DOCUMENTS

| | | | | |
|---|---|---|---|---|
| 2003/0189805 | A1* | 10/2003 | Brachmann | H02H 3/243 361/90 |
| 2005/0083716 | A1* | 4/2005 | Marquardt | H02M 5/271 363/132 |
| 2007/0200538 | A1* | 8/2007 | Tang | H02M 3/157 323/237 |
| 2009/0108818 | A1* | 4/2009 | Murayama | H02M 3/156 323/234 |
| 2009/0309421 | A1 | 12/2009 | Ängquist et al. | |
| 2010/0085105 | A1 | 4/2010 | Bayerer et al. | |
| 2010/0254427 | A1* | 10/2010 | Pan | G01K 7/01 374/152 |
| 2011/0013441 | A1 | 1/2011 | Gruber et al. | |
| 2011/0210747 | A1* | 9/2011 | Heo | G01R 31/3658 324/434 |
| 2012/0176176 | A1* | 7/2012 | Swamy | H03K 17/04123 327/399 |
| 2013/0094267 | A1* | 4/2013 | Heo | H02M 7/483 363/132 |
| 2014/0003616 | A1* | 1/2014 | Johnson | H04R 29/001 381/74 |
| 2014/0167513 | A1* | 6/2014 | Chang | H02J 3/385 307/52 |
| 2015/0263545 | A1* | 9/2015 | Takai | H02J 7/0013 320/162 |

FOREIGN PATENT DOCUMENTS

| | | |
|---|---|---|
| EP | 0 868 014 A1 | 9/1998 |
| EP | 2 282 399 A1 | 2/2011 |
| EP | 2 549 634 A1 | 1/2013 |
| WO | WO 2007/055593 A1 | 5/2007 |
| WO | WO 2010/051854 A1 | 5/2010 |
| WO | WO 2010/127699 A1 | 11/2010 |
| WO | WO 2011/114816 A1 | 9/2011 |

\* cited by examiner

BLACK START OF A MULTILEVEL VOLTAGE SOURCE CONVERTER

FIELD OF THE INVENTION

The present invention generally relates to converters for conversion between AC and DC. More particularly the present invention relates to a multilevel voltage source converter as well as to a method for energizing chargeable power supply units of cells of a multilevel voltage source converter.

BACKGROUND

Cell based multilevel voltage source converters are known to be used for converting between AC and DC voltages for instance between AC and DC power transmission systems.

The cells of these converters are made up of switches, often in the form of pairs of switching elements with antiparallel diodes, where the switching elements may be Integrated Gate Bipolar Transistors (IGBTs). In order to be able to control the switching elements, the cells are often equipped with gate control units, which are responsible for providing gate voltages of sufficient magnitude to be able to operate the switching elements.

It is often of interest to only use the power of the AC or DC system for energizing these gate control units.

In this way it is possible to avoid using an auxiliary power supply system, which increases the reliability of the power supply. An auxiliary power supply system may be expensive but also difficult to provide, especially if the converter is to be located in a remote and inaccessible location.

Furthermore, if the converter is to be black started there is no accessible power supply to all of the gate units. When performing energizing only some of the gate control units will receive power, the others will not.

Black starts may be required in for instance offshore windfarm applications.

Black starts in relation to voltage source converters is described in US 2009/0309421 and in WO 2007/055593. However none of these documents discuss the black start of a cell based multilevel voltage source converter.

There is therefore a need for providing a black start of a multilevel voltage source converter.

SUMMARY OF THE INVENTION

The present invention addresses this situation. The invention is thus directed towards providing a black start of a multilevel voltage source converter.

This is according to one aspect of the invention achieved through a multilevel voltage source converter comprising
cells connected in cascade, each having
a first and a second cell terminal,
a cell capacitor,
a first switch between a first end of the cell capacitor and the first cell terminal,
a second switch between a second end of the cell capacitor and the first cell terminal,
where the second cell terminal is provided via the first or the second end of the cell capacitor,
a first chargeable power supply unit connected in parallel with the first switch, and
a second chargeable power supply unit connected in parallel with the second switch, and
a black start control unit configured to
perform, after the initial application of a DC voltage to a cell terminal of a cell and the subsequent initial charging of the chargeable power supply unit of one of the switches,
charging of an uncharged power supply unit of the other switch through repeatedly turning on and off the switch with initially charged power supply unit.

This object is according to another aspect of the invention achieved through a method for energizing chargeable power supply units of cells of a multilevel voltage source converter, where each cell comprises
a first and a second cell terminal,
a cell capacitor,
a first switch between a first end of the cell capacitor and the first cell terminal,
a second switch between a second end of the cell capacitor and the first cell terminal, where a second cell terminal is provided via the first or the second end of the cell capacitor,
a first chargeable power supply unit connected in parallel with the first switch, and
a second chargeable power supply unit connected in parallel with the second switch
the method comprising
performing, after the initial application of a DC voltage to a cell terminal of a cell and the subsequent initial charging of the chargeable power supply unit of one of the switches,
charging of an uncharged power supply unit of the other switch through repeatedly turning on and off the switch with initially charged power supply unit.

The invention has a number of advantages. It allows black start to be performed without having to use external power supply units. External power supply units may not be available. They may also be undesirable for reasons such as cost. They may for these reasons be undesirable in some applications such as in offshore windfarms. To rely on external power supply units would also impose limitations on the reliability of the black start capability. Black start is according to the invention also possible without having to use the cell capacitor as a power source.

BRIEF DESCRIPTION OF THE DRAWINGS

The present invention will in the following be described with reference being made to the accompanying drawings, where
FIG. 1 schematically shows a cell-based multilevel voltage source converter according to one variation of the invention for conversion between AC and DC voltages,
FIG. 2 schematically shows one variation of a cell used in a voltage source converter,
FIG. 3 schematically shows pulses applied to a gate control unit of a first switch in a cell with initially charged power supply units, and
FIG. 4 schematically shows a flow chart of a number of method steps being performed in a black start control unit of the voltage source converter.

DETAILED DESCRIPTION OF THE INVENTION

In the following, embodiments of the invention will be described.

The present invention is directed towards providing a multilevel voltage source converter with black start capability, for conversion between AC and DC. This converter may as an example be provided in a converter station linking a Direct Current (DC) system with an Alternating Current (AC) system, which systems may both be power transmission systems. The alternating current system may here furthermore comprise an offshore windfarm provided offshore.

The DC system can be a High Voltage Direct Current (HVDC) power transmission system and the AC system can be a Flexible Alternating Current Transmission System (FACTS). However these types of systems are mere examples of such systems and should not be considered as a requirement. The invention can also be applied in for instance power distribution systems. The converter may also be provided as a part of a back-to-back converter between two AC systems or as part of a DC/DC converter.

Figure 1:
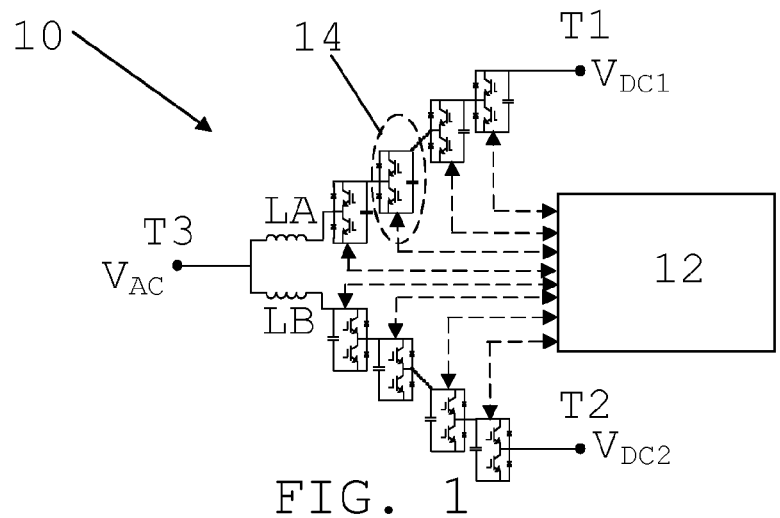

FIG. 1 schematically shows a multilevel voltage source converter 10 according to one variation of the invention for provision in an HVDC converter station. The converter 10 has a DC side with a first DC terminal T1 for providing a first DC voltage $V_{DC1}$ and a second DC terminal T2 for providing a second DC voltage $V_{DC2}$. The first DC voltage is also termed a first pole voltage, while the second DC voltage is termed a second pole voltage. The converter also comprises an AC side with at least one AC terminal T3 for providing an AC voltage.

The converter 10 is cell-based, which means that it comprises a number of cells 14. There is in this embodiment a first group of cells connected in cascade between the first DC terminal T1 and the AC terminal T3. There is here also a first phase reactor LA connected between the AC terminal T3 and the first group of cells. In the converter there is also a second group of cells connected in cascade between the second DC terminal T2 and the AC terminal T3. There is here also a second phase reactor LB connected between the AC terminal T3 and the second group of cells. The first phase reactor LA and the first group of cells here form a first phase arm, while the second phase reactor LB and the second group of cells form a second phase arm.

The first and second phase arms together form a phase leg that stretches between the two DC terminals T1 and T2. There is normally three such phase legs connected between the two DC terminals, each provided with a corresponding AC terminal. The phase arms may furthermore be symmetrical to each other in relation to the AC terminal. They may thus have the same amount of cells on both sides of the AC terminal and the same sized phase reactors. Here only one phase leg is shown in order to simplify the description of the invention. It is however possible with for instance two phase arms.

Each cell 14 is in this embodiment a half-bridge cell having a first and a second cell terminal. In the first group of cells, the first cell terminal of a first cell is connected to the first phase reactor LA and the second cell terminal of this cell is connected to the first cell terminal of a following cell. The second cell terminal of this following cell is then connected to the first cell terminal of a next cell. In this way cells are connected in cascade until the second terminal of the last cell of the first group is connected to the first DC terminal T1. In the second group of cells, the second cell terminal of a first cell is connected to the second phase reactor LB and the first cell terminal of this cell is connected to the second cell terminal of a following cell. The first cell terminal of this following cell is then connected to the second cell terminal of a next cell. In this way cells are connected in cascade until the first terminal of the last cell of the second group is connected to the second DC terminal T2.

All the cells in a group are being used in forming DC voltages. The cells each provide a cell voltage that contributes to the pole voltage. The voltage of the cells of a cell arm are selected to provide the voltage $V_{DC1}-V_{DC2}$, which if $V_{DC1}=-V_{DC2}$ can be the voltage $2*V_{DC1}$. Each cell of a phase arm, such as the first phase arm, may thus have a voltage $2*V_{DC1}/j$, where j is the number of cells in a cell arm. This means that the voltage $2*V_{DC1}/j$, $(V_{DC1}-V_{DC2})/j$ or $-2*V_{DC2}/j$ will be applied between the first and second cell terminals.

Finally the converter comprises a black start control unit 12 configured to control black start of the converter 10. The black start control unit may be provided as a part of a valve control device for controlling gate control units of the cells.

The main control functionality of a valve control device is to provide the AC voltage $V_{AC}$ on the AC terminal T3, which is done through switching the switch of the cells, while providing the DC voltages on the poles, which is as such known.

Figure 2:
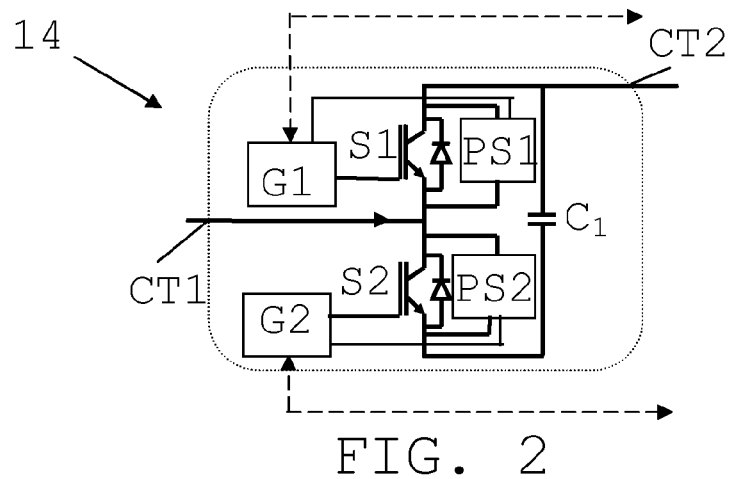

FIG. 2 schematically shows a cell 14 according to one variation of the invention. The cell 14 is in this embodiment a half-bridge cell. This means that it is provided with two switches S1 and S2 connected in series with each other. The series-connected switches are furthermore connected in parallel with a cell capacitor C1. The midpoint between two switches here forms the first cell terminal CT1, while the second cell terminal CT2 is provided via one end of the cell capacitor. In this way either the connection point between the first switch S1 and a first end of the cell capacitor C1 or the connection point between the second switch S2 and a second end of the cell capacitor C1 forms the second cell terminal in the half-bridge cell.

In this embodiment of the invention, the connection point between the first switch S1 and the first end of the cell capacitor C1 forms the second cell terminal CT2.

Each switch S1 and S2 is made up through a switching element together with an anti-parallel diode. The switching element may for instance be a semiconductor of turn-off type. In this example the semiconductor of turn-off type is an Insulated Gate Bipolar Transistor (IGBT). However, also other types can be used such as Integrated Gate-Commutated Thyristors (IGCT), Metal-Oxide-Semiconductor Field-Effect Transistors (MOSFET) or BImode insulated Gate Transistors (BIGT).

The gates of the semiconducting elements are here furthermore connected to corresponding gate control units G1 and G2 that receive logical gate control signals from the black start control unit 12 and converts these logical gate control signals to voltage levels suitable for application on gates of the IGBTs. The first gate control unit G1 is thus connected to the gate of the switching element of the first switch S1 for controlling this first switch S1, while the second gate control unit G2 is connected to the gate of the switching element of the second switch S2 for controlling this second switch S2. The gate control units S1 and S2 may also receive and provide other types of control signals, for instance through communication with the black start control unit 12. These types of signals are here indicated with dashed bidirectional arrows. These signals may furthermore be optical.

The gate control units G1 and G2 need power to be able to operate and for this reason they are each connected to a corresponding power supply unit PS1 and PS2, each being connected in parallel with a corresponding switch S1 and S2. There is thus a first power supply unit PS1 connected in parallel with the first switch S1 and also connected to the first gate control unit G1 for providing power to this first gate control unit G1. In the same manner there is a second power supply unit PS2 connected in parallel with the second switch S2 and also connected to the second gate control unit G2 for providing power to this second gate control unit G2. The power supply units PS1 and PS2 may each comprise an energy storage element, for instance in the form of a capacitor, for supplying power for operation of the corresponding gate control unit. The energy storage element may then be charged if a voltage is applied over the switch. In normal operation the energy storage elements of the power supply units will then be repeatedly charged and thereby the gate control units can be powered without having to be connected to any auxiliary power systems, which is of advantage for many reasons and particularly because of reliability.

The above-mentioned first and second switches S1 and S2 are, as was described earlier, normally each made up of a number of series connected semiconductors of turn-off type with anti-parallel diodes. There are thus typically a number of IGBT anti-parallel diode pairs in each switch, typically eight. There is for this reason also typically one gate control unit for each such pair. These have however been omitted in order to clarify the description of the present invention.

Figure 3:
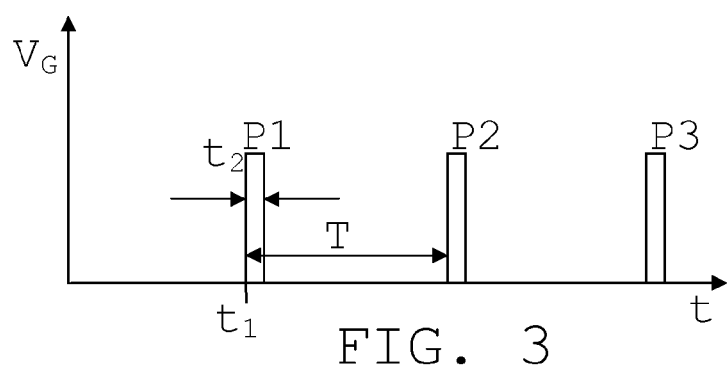

FIG. 3 schematically shows a number of pulses P1, P2 and P3 of a gate voltage $V_G$ applied to the gate of the first switch of a cell.

Figure 4:
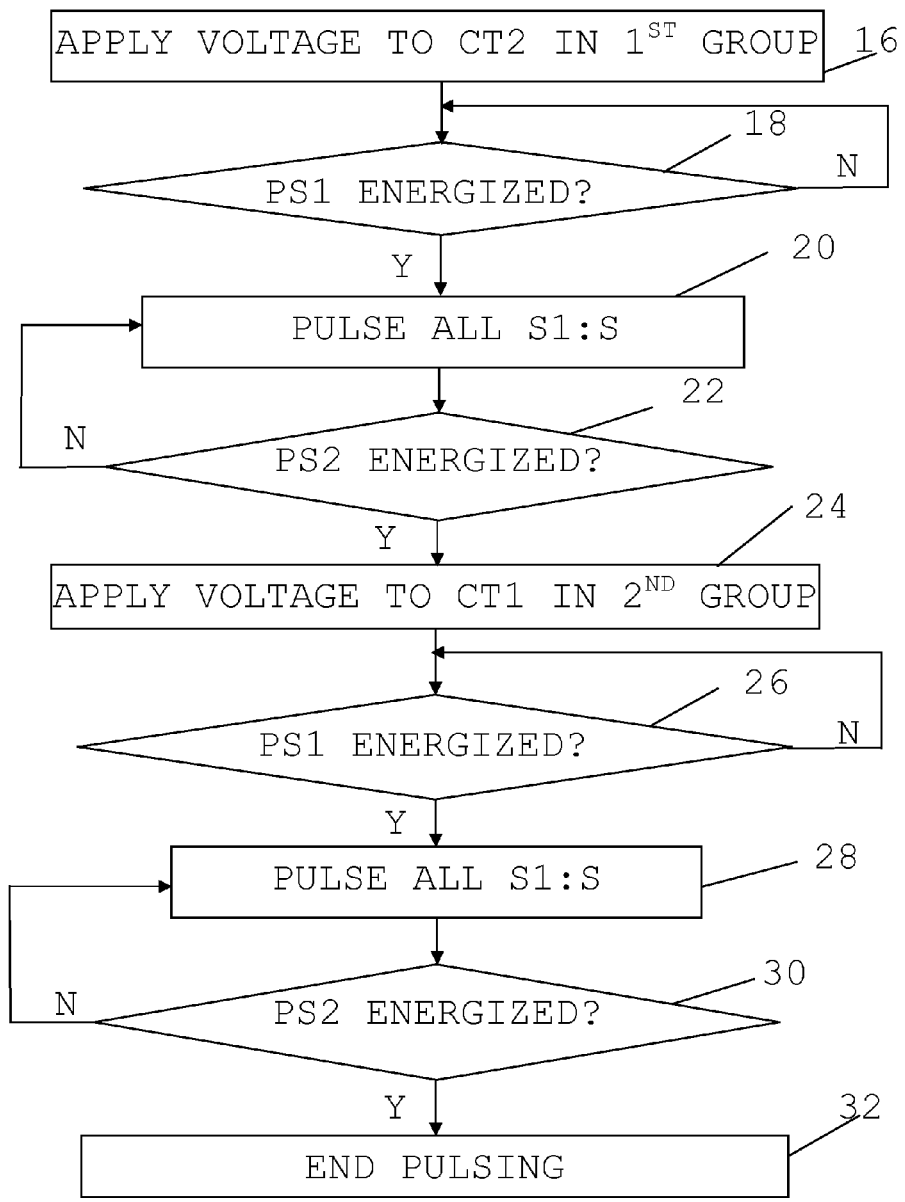

Now the functioning of the invention according to the first embodiment will be described in more detail with reference being made to FIGS. 1, 2 and 3 as well as to FIG. 4, which shows a flow chart of a number of method steps being performed in the black start control unit 12 of the voltage source converter 10.

A multilevel voltage source converter may need to be black started in various different environments, for instance in relation to offshore windfarm applications.

When there is such a need the switches of the cells are being blocked. In order to unblock the switches the power supply units must be energized. When they have been energized, it is then possible to allow the gate control unit to unblock and operate the switches.

Take the cell in FIG. 2 as an example with the assumption that the second cell terminal CT2 is coupled to a DC terminal of the converter and the first cell terminal CT1 coupled to an AC terminal. Here the term coupling is used in order to indicate that further elements, like further cells, may be placed between the cell in question and the converter terminal.

If energizing of this cell is performed using an AC voltage appearing on a cell terminal receiving the AC voltage, for instance the first cell terminal CT1 in FIG. 2, current will alternately flow through the first switch S1 and the second switch S2. When the first switch S1 is controlled to conduct current, the second switch S2 will experience the cell voltage from the cell capacitor C1 and thereby the second power supply unit PS2 will be energized, while if the second switch S2 is controlled to conduct current, the first switch S1 will experience the cell voltage from the cell capacitor C1 and thereby the first power supply unit PS1 will be energized. After a few seconds of this type of operation the power supply units of both switches S1 and S2 have experienced a voltage of sufficient amplitude and duration to charge and thus enable driving of the gate control units.

If however energizing is made via a cell terminal receiving a DC voltage, for instance the second cell terminal CT2 in FIG. 2, then the cell capacitor C1 is charged by a DC current flowing through the diode of the second switch S2. The cell voltage is then continuously applied across the first switch S1 with the second switch S2 being continuously bypassed. In this scenario the second power supply unit PS2 will not be energized and therefore the second gate control unit G2 will not be possible to operate. The second switch S2 can therefore not be unblocked.

The present invention is directed towards providing a solution to this situation.

Before operation according to the invention is started it is assumed that the cell capacitors are charged and the switches are being blocked. Here the power supply units PS1 and PS2 of the cells are not energized and therefore the gate control units G1 and G2 cannot operate. Thereby it is impossible to unblock the switches S1 and S2. When a black start is commenced according to the first embodiment of the invention, then first a DC voltage is applied to the first DC terminal T1. This DC voltage is typically positive and higher than the sum of the cell voltages in order to cause a current to run through the cells in the first group from the first DC terminal T1. The DC voltage may be applied through the control of the black start control unit 12. It is however possible that it is applied through some other means, such as through an operator effecting the application.

This applying of a DC voltage at the first DC terminal T1 will cause a DC voltage to be applied to the second cell terminal CT2 of the cells in the first group, step 16, which latter voltage in turn causes the cell voltage to be applied over the first switch S1 and thereby the first power supply unit PS1 will start to get energized. The first power supply unit PS1 therefore gets initially charged after to the initial application of the DC voltage at the first DC terminal T1. It can therefore be seen that the first switch S1 experiences a voltage drop caused by the DC voltage applied to the second cell terminal CT2. This applied DC voltage is typically higher than the cell voltage, i.e. the voltage across the cell capacitor C1. The application of the DC voltage at the second cell terminal CT2 thus causes the first switch to experience a voltage drop, where the voltage drop in turn corresponds to the cell voltage. The second switch S2 does here not experience any voltage drop. The black start control unit 12 may keep track of the time at which the first power supply units PS1 are energized. This may be done through knowledge of the voltages used, the number of cells used, the component sizes and information about the time of application of a DC voltage.

The black start control unit 12 will then continually investigate if the first power supply units PS1 are energized. When they have been energized, step 18, which happens at a first time $t_1$, the black start control unit 12 will proceed and energize the second power supply units PS2 of the first group of cells. This is according to the first embodiment of the invention done through simultaneously pulsing all the first switches S1 of the cells in the first group, i.e. the cells between the first DC terminal T1 and the AC terminal T3, step 20. This is done through sending a gate turn on signal from the black start control unit 12 to all the first gate control units G1 of the cells in the first group. These gate control units G1 will then be able to turn on the first switches S1. They are here turned on for a time duration $t_2$, which may be below 5 ms and is here about 1 ms. It may however be between 100 µs and 1 ms. When this time duration expires the first switches S1 are then turned off.

Thereafter the black start control unit waits a time T until again turning on the first switches S1.

In this way the black start control unit sends a number of pulses P1, P2, and P3 to the first gate control units G1 having a pulse width of 1 ms, where the period T of the pulses is below 45 ms and may be about 40 ms. There is thus a pulse repetition rate of above 20 Hz. The switching is furthermore performed with a duty cycle in the range between 0.01 and 0.1. When the first switches S1 are switched on in this way a voltage will be applied over the second switches S2, which will energize the second power supply units PS2. Through repeatedly turning on and off these switches that experience a voltage drop and that are provided between the first and the second cell terminal, the power supply unit for the other switch, which does originally not experience a voltage drop, is energized. This also means that after the initial application of a DC voltage to a cell terminal and the subsequent initial charging of the chargeable power supply unit of a switch, charging of the uncharged power supply unit of the other switch switch is performed through repeatedly turning on and off the switch with initially charged power supply unit. This other switch is connected on the opposite side of the first cell terminal CT1 in relation to the switched switch. The pulse width and pulse repetition rate are here selected so that the second power supply units are energized with a minimum change of the voltage applied on the first DC terminal.

The black start control unit then investigates if the second power supply units PS2 have been sufficiently energized. If they have not, step 22, then pulsing is continued, step 20, while if they have, step 22, then the black start control unit 12 continues with energizing of the second group of cells. Sufficient energizing of the second switches in the first group may here be obtained after approximately 1 s.

When black start is then commenced of the cells in the second group a DC voltage is applied to the DC terminal T2. This voltage is typically a negative DC voltage which causes a negative DC voltage to be applied to the first cell terminal CT1 of the cells in the second group, step 24, which latter voltage in turn also causes the cell voltage of the cells in the second group to be applied over the first switch S1 and thereby the first power supply unit PS1 will start to get energized. Also here the black start control unit 12 may keep track of the time at which the first power supply units PS1 are energized. When they have been energized, step 26, the black start control unit 12 then continues and simultaneously pulses all the first switches S1 of the cells in the second group, i.e. the cells between the second DC terminal T2 and the AC terminal T3, step 28.

Also this may be done through sending a gate turn on signal from the black start control unit 12 to all the first gate control units G1 of the cells in the second group. These gate control units G1 will then be able to turn on the first switches S1. They may here be turned on for the same time duration $t_2$ as the first switches in the first group of cells and thus turned on at the beginning of the time duration and turned off at the end of the time duration. Thereafter the black start control unit 12 waits a time T until again turning on the first switches S1. In this way the black start control unit 12 also here sends pulses P1, P2, and P3 to the first gate control units G1. When the first switches S1 are switched on in this way a voltage will also here be applied over the second switches S2, which will energize the second power supply units PS2. The black start control unit 12 will then again investigate if the second power supply units PS2 are sufficiently energized. If they are not, step 30, then pulsing is continued, step 28, while if they are, step 30, the pulsing is ended, step 32.

It is then possible to connect the voltage source converter to an AC system for instance an AC system comprising an offshore windfarm.

It can in this way be seen that the multilevel voltage source converter can be black started without having to resort to the use of any other means than DC voltages obtained via the converter terminals.

It should be realized that the invention could be varied in a number of ways. It is for instance possible that the first switches of the first and the second group of cells are energized simultaneously. This may be combined with the second power supply units being energized simultaneously. It is thus possible that pulses are sent simultaneously to the first switches of both the first and second group of cells.

It is also possible that the power supply units of a group are energized sequentially or consecutively, i.e. one at a time. It is here possible that the second power supply unit of a following cell is not started to be energized until the second power supply unit of a previous cell has been energized. As an alternative it is possible that there is only a slight delay in that one or more following cells receive a pulse in the interval between two pulses applied to a previous cell and that no such pulses are sent simultaneously to two cells in a group. This type of operation can also be performed simultaneously for the two groups or separately, i.e after each other in time.

Another possible variation is that a DC current is being supplied via the AC terminal. This means that a DC voltage higher than the cell voltage may be applied to the first cell terminal, in which case the second switches S2 may be pulsed instead. It is also possible that the inventive concept is used also on other types of cells, such as full-bridge cells or half-bridge cells with the second cell terminal provided at the second end of the cell capacitor. In the case of full-bridge cells there is an additional series connection of a third and fourth switch in parallel with the cell capacitor in the same way as the first and second switch. In this case the second cell terminal is provided via one end of the cell capacitor through being placed at the midpoint between the third and fourth switches. When pulsing a full-bridge cell the first and fourth switches are pulsed simultaneously or the second and third switches are pulsed simultaneously.

The invention has a number of advantages. It allows black start to be performed without having to use external power supply units and without having to use the cell capacitor. External power supply units may not be available or desirable from a cost-perspective, in some applications such as offshore windfarms. To rely on external power supply units would also impose limitations on reliability of the black start capability.

The power supply unit may be realized through an energy storage element together with a voltage dividing arrangement dividing the voltage applied over a switch to a suitable power supply level. Here the voltage dividing arrangement may be provided through the use of resistors. The energy storage element was above described in the form of a capacitor. It should be known that it may be another type of element such as a chargeable battery.

The black start control unit may be provided as a processor with computer program memory including computer program code instructions causing the computer or processor to perform the functionality of these element and units.

From the foregoing description of different variations of the present invention, it should be realized that it is only to be limited by the following claims.

The invention claimed is:

1. A multilevel voltage source converter comprising:
   cells connected in cascade, each of the cells having:
   a first and a second cell terminal;
   a cell capacitor;
   a first switch between a first end of the cell capacitor and the first cell terminal;
   a second switch between a second end of the cell capacitor and said first cell terminal, where the second cell terminal is provided via the first or the second end of the cell capacitor;

a first chargeable power supply unit connected in parallel with the first switch; and a second chargeable power supply unit connected in parallel with the second switch; and a black start control unit configured to perform, after the initial application of a DC voltage to a cell terminal of a cell and the subsequent initial charging of the chargeable power supply unit of one of the switches, charging of an uncharged power supply unit of the other switch through repeatedly turning on and off the switch with the initially charged power supply unit.

2. The multilevel voltage source converter according to claim 1, wherein the black start control unit is configured to start to operate after the cell capacitor has been charged to a cell voltage that contributes to a pole voltage.

3. The multilevel voltage source converter according to claim 1, wherein the black start control unit is configured to repeatedly turn on said switch at a frequency above 20 Hertz and a duration below 5 ms.

4. The multilevel voltage source converter according to claim 1, wherein the black start control unit is configured to switch the switch with a duty cycle between 0.01 and 0.1.

5. The multilevel voltage source converter according to claim 1, further comprising a first DC terminal and a second DC terminal for providing a first pole voltage $V_{DC1}$ at the first DC terminal and a second pole voltage $V_{DC2}$ at the second DC terminal, where said cells are provided in a phase leg, an AC terminal is provided in the middle of the phase leg for providing an AC voltage $V_{AC}$, and each cell comprises a first gate control unit for controlling the first switch and a second gate control unit for controlling the second switch, where the first power supply unit is provided for supplying power to the first gate control unit and the second power supply unit is provided for supplying power to the second gate control unit.

6. The multilevel voltage source converter according to claim 5, wherein a DC voltage is applied to all cells of the converter and the black start control unit is configured to perform charging of uncharged chargeable power supply units in all cells of the converter.

7. The multilevel voltage source converter according to claim 6, wherein the cells in the phase leg are provided in a first group of cells between the first DC terminal and the AC terminal and a second group of cells between the second DC terminal and the AC terminal, wherein the black start control unit is configured to perform charging of uncharged chargeable power supply units in one group before the other group.

8. The multilevel voltage source converter according to claim 6, wherein the black start control unit is configured to perform charging of power supply units in the cells of a group simultaneously.

9. The multilevel voltage source converter according to claim 6, wherein the black start control unit is configured to perform charging of power supply units in the cells of a group sequentially.

10. A method for energizing chargeable power supply units of cells of a multilevel voltage source converter, where each cell comprises:
a first and a second cell terminal;
a cell capacitor;
a first switch between a first end of the cell capacitor and the first cell terminal;
a second switch between a second end of the cell capacitor and the first cell terminal, where a second cell terminal is provided via the first or the second end of the cell capacitor;
a first chargeable power supply unit connected in parallel with the first switch; and
a second chargeable power supply unit connected in parallel with the second switch, said method comprising the step of:
performing, after the initial application of a DC voltage to a cell terminal of a cell and the subsequent initial charging of the chargeable power supply unit of one of the switches, charging of an uncharged power supply unit of the other switch through repeatedly turning on and off the switch with the initially charged power supply unit.

11. The method according to claim 10, wherein the performing of the method is made after the cell capacitor has been charged to a cell voltage that contributes to a pole voltage.

12. The method according to claim 10, wherein said switch repeatedly turned on at a frequency above 20 Hertz and a duration below 5 ms.

13. The method according to claim 10, wherein the step of repeatedly turning on the switch comprises switching the switch with a duty cycle between 0.01 and 0.1.

14. The method according to claim 10, wherein the voltage source converter comprises a first DC terminal and a second DC terminal for providing a first pole voltage $V_{DC1}$ at the first DC terminal and a second pole voltage $V_{DC2}$ at the second DC terminal, where said cells are provided in a phase leg and an AC terminal is provided in the middle of the phase leg for providing an AC voltage $V_{AC}$, where furthermore a DC voltage is applied to all cells of the phase leg and the charging of uncharged chargeable power supply units is performed for all cells of the phase leg.

15. The method according to claim 14, wherein the cells in the phase leg are provided in a first group of cells between the first DC terminal and the AC terminal and a second group of cells between the second DC terminal and the AC terminal and the charging of uncharged chargeable power supply units is performed in one group before the other group.

16. The method according to claim 14, wherein the charging of power supply units in the cells of a group is performed simultaneously.

17. The method according to claim 14, wherein the charging of power supply units in the cells of a group is performed sequentially.

18. The multilevel voltage source converter according to claim 2, wherein the black start control unit is configured to repeatedly turn on said switch at a frequency above 20 Hertz and a duration below 5 ms.

19. The multilevel voltage source converter according to claim 2, wherein the black start control unit is configured to switch the switch with a duty cycle between 0.01 and 0.1.

20. The multilevel voltage source converter according to claim 3, wherein the black start control unit is configured to switch the switch with a duty cycle between 0.01 and 0.1.

* * * * *